United States Patent Office 2,760,987
Patented Aug. 28, 1956

2,760,987

METHOD OF MAKING β-KETOACETALS

Donald M. Burness, Rochester, N. Y., assignor to Eastman Kodak Company, Rochester, N. Y., a corporation of New Jersey No Drawing. Application May 26, 1953,
Serial No. 357,645

3 Claims. (Cl. 260—594)

This invention relates to the preparation of β-ketoacetals and is particularly concerned with a new method of making a dialkyl acetal of β-ketobutyraldehyde.

The β-ketoacetals are useful intermediates in the synthesis of α,β-unsaturated aldehydes, and the dialkyl acetals of β-ketobutyraldehyde are particularly useful in the synthesis of vitamin A compounds, sulfamerazine and similar pharmaceuticals.

It is an object of this invention to provide a new method of making β-ketoacetals without the disadvantages attendant to processes employing β-chlorovinyl ketones.

It is a further object of this invention to provide a new and convenient method of preparing β-ketoacetals employing stable and readily prepared intermediates.

Another object of the invention is to provide a method adapted for large-scale production of β-ketoacetals in good yield.

Another object of the invention is to facilitate the synthesis of vitamin A by making available in commercial quantities a useful intermediate in vitamin A syntheses.

Another object of the invention is to provide a hitherto unknown and effective method of making dialkyl acetals of β-ketobutyraldehyde.

Other objects will be apparent from the description and claims which follow.

These and other objects of the invention are attained by the process comprising reacting an alkali metal formyl acetone such as sodium formyl acetone (also sometimes called sodium hydroxy methylene acetone) with an alkyl halide and an alkyl alcohol and thereby forming a dialkyl acetal of β-ketobutyraldehyde. In a preferred embodiment of the invention, the alkali metal formyl acetone is prepared by reacting an alkali metal with an alkyl formate, such as methyl or ethyl formate, and acetone, separating the resulting salt from the reaction mixture, and reacting the salt with an alkyl halide in a solution of the corresponding alkyl alcohol and in the presence of an alkali metal iodide.

The alkali metal formyl acetone compounds are readily prepared and form stable intermediates particularly adapted for commercial production of the desired β-ketoacetals. A preferred method of preparing the alkali metal salt is illustrated by the following equation wherein the alkali metal is sodium, it being understood that potassium or lithium or an alkali metal alkoxide such as sodium methoxide can be used instead of the preferred sodium metal if desired.

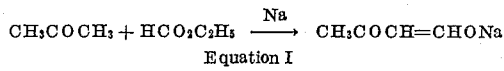

Equation I

The reaction illustrated in Equation I is desirably carried out in dry ether or other suitable anhydrous solvent media at a temperature below room temperature, as for example at 0–10° C. The alkali metal formyl acetone is then separated from the reaction mixture to free it of unreacted sodium, sodium alkoxides or the like which catalyze undesired side reactions in the subsequent steps.

The alkali metal formyl acetone thus prepared is thereafter reacted with an alkyl halide in a solution of an alkyl alcohol in the presence of an alkali metal iodide such as sodium iodide or potassium iodide. Any of the well-known alkyl halides can be employed with the bromides being preferred to the less suitable chlorides, iodides and fluorides. Similarly any of the well-known alkyl alcohols can be employed, and in the preferred embodiment, the alkyl alcohol corresponds to the alkyl halide. Thus, for example, methyl alcohol is desirably employed with a methyl halide; ethyl alcohol with an ethyl halide, etc. The alkyl group can be any alkyl group depending upon the particular acetal desired; although, for convenience, the lower alkyl halides and alcohols are preferred, such as the methyl, ethyl, propyl and butyl halides and alcohols. The reaction is desirably carried out in a solution of the absolute alkyl alcohol, no other solvent being necessary. The reaction is illustrated by the following equation typifying the preparation of a diethyl acetal:

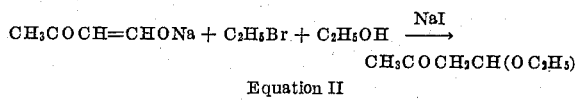

Equation II

The invention is illustrated by the following examples of a preferred embodiment, it being understood that the reactants can be varied as described hereinabove.

*Example 1*

A mixture of 48 g. of powdered sodium metal in 500 ml. of dry ether was placed in a 2-liter 3-necked flask, and cooled in an ice-salt bath. The mixture was stirred and maintained at a temperature of 0–10° C. while a mixture of 200 g. of ethyl formate and 120 g. of acetone was added dropwise over a period of 1.5 hours. The resulting reaction mixture was allowed to stand overnight, then filtered, washed with ether, and dried over calcium chloride in a vacuum desiccator. The product, sodium formyl acetone, was a cream colored solid and weighed 205 g. The sodium salt can also be prepared employing a sodium alkoxide such as sodium ethoxide or sodium methoxide in place of the metallic sodium. Other alkali metal salts such as the potassium salt are prepared in like manner.

*Example 2*

A mixture of 200 g. of the dry sodium formyl acetone, 1000 ml. of absolute ethanol, 370 g. of ethyl bromide, and 1 g. of sodium iodide was stirred at room temperature and under anhydrous conditions for 88 hours. An additional 100 g. portion of ethyl bromide was added, and the reaction mixture was heated under reflux for an additional 8 hours. Solids were removed from the reaction mixture by filtration, and residual alcohol was removed from the filtrate by vacuum evaporation. The weakly alkaline residual oil thus obtained was dried over anhydrous magnesium sulfate, filtered again, stabilized with a trace of hydroquinone and distilled. The fraction boiling in the range of from 62° C. at 6 mm. pressure to 75° C. at 8 mm. pressure was collected and weighed 122 g. The product was then dried over anhydrous magnesium sulfate and, redistilled through a 6-inch Vigreux column to give 101 g. of colorless liquid having B. P.= 66–68° C. at 8 mm. and $n_D^{23.5} = 1.4268$. The analysis showed C=61.2 and H=10.2 as compared to the calculated C=60.0 and H=10.1 for $C_8H_{16}O_3$. Infra-red analysis showed the product to be predominantly the diethyl acetal of β-ketobutyraldehyde.

The invention thus provides an effective method of making dialkyl acetals of β-ketobutyraldehyde from stable and readily prepared intermediates.

While the invention has been described in considerable detail with reference to certain preferred embodiments thereof, it will be understood that variations and modifications can be effected within the spirit and scope of the invention as described hereinabove and as defined in the appended claims.

I claim:

1. The method of making a dialkyl acetal of β-ketobutyraldehyde which comprises reacting an alkali metal formyl acetone, an alkyl halide, and an alkyl alcohol in the presence of an alkali metal iodide.

2. The method of making a dialkyl acetal of β-ketobutyraldehyde which comprises reacting sodium formyl acetone with an alkyl halide and an alkyl alcohol in the presence of sodium iodide.

3. The method of making a dialkyl acetal of β-ketobutyraldehyde which comprises reacting an alkali metal formyl acetone with an alkyl bromide and an alkyl alcohol in the presence of an alkali metal iodide.

References Cited in the file of this patent

UNITED STATES PATENTS

| | | |
|---|---|---|
| 2,409,015 | Bordenca et al. | Oct. 8, 1946 |
| 2,570,713 | Richmond | Oct. 9, 1951 |

OTHER REFERENCES

Kaushal: Chem. Abstr. 37, p. 6647.